(12) United States Patent
O'Connell et al.

(10) Patent No.: US 8,874,656 B2
(45) Date of Patent: Oct. 28, 2014

(54) METHOD AND SYSTEM FOR FUND VISUALIZATION

(75) Inventors: Paul O'Connell, Wilmington, MA (US); David Nguyen, Newton, MA (US); George White, Cambridge, MA (US); Matt Crist, Jamaica Plain, MA (US); Michael Tuccinard, Shrewsbury, MA (US); Matthew Stuehler, Westwood, MA (US); Michael Novak, Needham, MA (US)

(73) Assignee: Putnam Investments, LLC, Boston, MA (US)

( * ) Notice: Subject to any disclaimer, the term of this patent is extended or adjusted under 35 U.S.C. 154(b) by 84 days.

(21) Appl. No.: 13/307,451

(22) Filed: Nov. 30, 2011

(65) Prior Publication Data
US 2013/0138721 A1    May 30, 2013

(51) Int. Cl.
*G06F 15/16* (2006.01)
(52) U.S. Cl.
USPC .......................................... 709/205; 709/204
(58) Field of Classification Search
CPC ....................................................... G06F 15/16
USPC ........................................ 709/203, 204, 205
See application file for complete search history.

(56) References Cited

U.S. PATENT DOCUMENTS

| | | | | |
|---|---|---|---|---|
| 7,729,977 | B2* | 6/2010 | Xiao et al. | 705/37 |
| 8,078,481 | B2* | 12/2011 | Steinbarth et al. | 705/4 |
| 8,185,466 | B2* | 5/2012 | Martinez et al. | 705/37 |
| 8,200,562 | B2* | 6/2012 | Sheridan | 705/36 R |
| 2005/0240578 | A1* | 10/2005 | Biederman et al. | 707/3 |
| 2009/0006226 | A1* | 1/2009 | Crowder | 705/30 |

* cited by examiner

*Primary Examiner* — Emmanuel L Moise
*Assistant Examiner* — Marie Georges Henry
(74) *Attorney, Agent, or Firm* — Gesmer Updegrove LLP

(57) ABSTRACT

A finds comparison tool is provided that includes a presentation tier providing a plurality of interfaces for interacting with a plurality of client applications. The presentation tier allows the client applications to send requests for a plurality of analytics to be performed regarding comparing the performance of one or more funds or portfolios as well allowing mobile-based client applications and web-based client applications to communicate with the funds comparison tool. An application tier processes the requests sent by the client applications by providing the data used by the client applications, storing and retrieving of session data, and an interface for the analytics information captured during sessions so as to allow a visualization of the analytics used in the comparison of the one or more funds or portfolios.

20 Claims, 7 Drawing Sheets

METHOD AND SYSTEM FOR FUND VISUALIZATION

BACKGROUND OF THE INVENTION

The invention is related to the field of funds comparison tools, and in particular to a funds comparison tool allowing advisors and clients access to comprehensive research and visualize fund comparison data.

The rapid growth and expansion of network and Internet technologies have facilitated electronic commerce transactions, particularly in the area of funds management. Taking advantage of the widespread availability of the Internet, numerous investment houses have gone online with finds management sites on the World Wide Web (web). These sites allow consumers to evaluate easily and conveniently from the comfort of their homes and offices their respective funds. However, there is a lacking of a hinds comparison tool allowing both advisors as well as consumers the ability to visualize and compare using up to date information on the performance of various funds so as to determine what funds are appropriate to which consumers.

SUMMARY OF THE INVENTION

According to one aspect of the invention, there is provided a funds comparison tool. The funds comparison tool includes a presentation tier that provides a plurality of interfaces for interacting with a plurality of client applications. The presentation tier allows the client applications to send requests for a plurality of analytics to be performed regarding comparing the performance of one or more funds or portfolios as well allowing mobile-based client applications and web-based client applications to communicate with the funds comparison tool. An application tier processes the requests sent by the client applications by providing the data used by the client applications, storing and retrieving of session data, and an interface for the analytics information captured during sessions so as to allow a visualization of the analytics used in the comparison of the one or more funds or portfolios.

According to another aspect of the invention, there is provided a method of performing comparison analysis of one or more funds or portfolios in a network environment using a funds comparison tool. The method includes providing a plurality of interfaces for interacting with a plurality of client applications using a presentation tier. Also, the method includes allowing the client applications to send requests for a plurality of analytics to be performed regarding comparing the performance of the one or more funds or portfolios as well as allowing mobile-based client applications and web-based client applications to communicate with the funds comparison tool. Furthermore, the method includes processing the requests sent by the client applications using an application tier by providing the data used by the client applications, storing and retrieving session data, and an interface for the analytics information captured during sessions so as to allow a visualization of the analytics used in the comparison of the one or more funds or portfolios.

DETAILED DESCRIPTION OF THE INVENTION

The invention is a funds comparison tool that provides financial advisors and clients with a modern experience to comprehensively research and more clearly visualize mutual fund comparison data. The invention is an open-architecture analytical tool, optimized for iPad, mobile phones/devices, and desktop usage, that enables in-depth evaluations of thousands investment choices in real time, using a plurality of selection criteria.

In particular, the funds comparison tool is a dynamic tool allowing for visually compelling, side-by-side comparisons of funds, across all categories, including electronic transfer funds (ETFs). Fund-to-fund comparisons or comparisons of portfolios of funds using data points related to performance, risk, and other crucial factors, and obtain a prospectus for any fund can be accomplished using the invention. Moreover, the information provided can be visualized in a context friendly fashion that is easily understood by both advisors and clients.

The invention can be used either on a desktop or mobile devices, such as the iPad, Android-based devices, and other mobile platforms. The software package that defines the invention is platform independent and can be stored and executed by a processor that lie within the various mobile devices as well as a computer systems used in accordance with the invention. Moreover, the invention operates in a client-server network environment that includes a plurality of computer systems or mobile devices intercommunicating with the other. Also, the various mobile devices and computer systems associated with the network can have different operating system executing on their respective platforms. The invention is platform independent and therefore does not require specific operating system platform.

Figure 1:
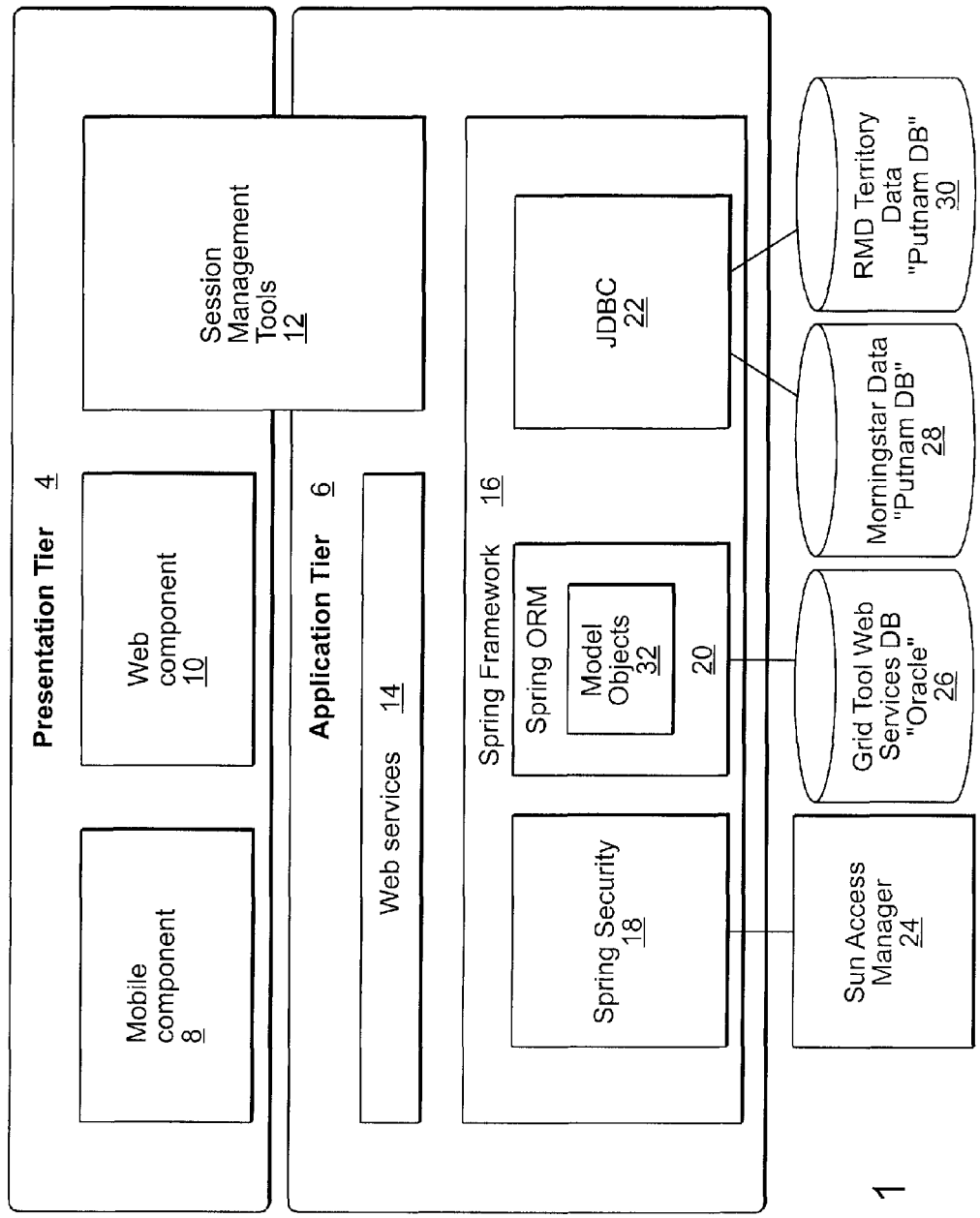
FIG. 1 is a schematic diagram illustrating the software architecture of the fund comparison tool.

FIG. 1 is a schematic diagram illustrating the software architecture of the funds comparison tool 2. The funds comparison tool 2 is modeled as a two-tier client-server architecture: a presentation layer having client components intended for use by the various end user populations (RMDs, advisers and RMAs) and an application tier having supporting web services and application logic. An additional pseudo-tier exists, including databases 26, 28, and 30 and services backing the application. The funds comparison tool 2 includes a mobile app and a web-based tool that are client applications interacting with the funds comparison tool.

The presentation tier 4 includes various client interfaces 8, 10, 12 for the funds comparison tool 2, including a Mobile component 8, a Web component 10, and the Session Management tools component 12. The true client applications (either the mobile app or web-based tool) interact with the application tier 6 components exclusively through the Web Services component 14. The web-based tool also interacts directly with the NetInsight interface; the web analytics endpoint provided by the Web Services component 14 is used exclusively by the mobile app.

The application tier 6 includes a Spring Framework 10. In addition to implementing the Web Services component 14 and Session Management tools component 12, the application tier 6 provides the container for the iPad application. The invention can include a monolithic application for all of these components or can split these components into separate applications.

The application tier 6 relies on a dedicated Oracle database 26 to provide fund data imported from the Morningstar data source 28, and the advisor address book or RMD territory database 30 can act as the repository of session data.

The funds comparison tool 2 also relies on the Spring framework 10 for authentication and authorization for the services for the mobile app. The web-based tool uses the access controls of the host web site to determine user information and access levels.

The Mobile component 8 is a web-deployed, offline-capable HTML5 application optimized for deployment on the Apple iPad or other mobile platforms. The Mobile component 8 is intended for use by various retail sales team (RMDs), and provides RMDs with tools for presenting fund-to-fund comparisons and portfolio models in real time. The primary use case for the Mobile component 8 is as an informational tool for use during a meeting with a financial advisor.

In addition to presenting fund and portfolio data, the Mobile component 8 captures "snapshots" of data during a given session and transmits the snapshots to a backend repository via the Web Services component 14. Captured sessions can be used for reporting purposes and can be retrieved and viewed by the Web component 10.

The Mobile component 8 also captures session-oriented analytical information for business intelligence and usage pattern analysis. This data is sent to the Web Services component 14, which is provided to the Putnam NetInsight Web analytics suite.

As an HTML5 application, this component can be modified for use on other platforms.

The Web component 10 is a Flash-based web application. The Web component 10 is targeted for use by financial advisors outside of Putnam. Like the Mobile component 8, the Web component 10 provides an interface for creating fund comparisons and portfolio models directly and is also able to display sessions captured on the mobile version and stored in the system.

The core of the funds comparison tool 2 is the Web Services component 14. The Web Services component 14 provides the data used by the clients, such as the Mobile component 8 and the Web component 10, data storage and retrieval for session data and an interface for the analytics information captured during sessions. The Web Services component 14 provides an interface for the client components of the system. The interface is composed of discrete HTTP URLs, each of which is responsible for a particular functional aspect of the funds comparison tool 2.

The Session Management tools component 12 includes a Reporting Tools component that is a web-based interface for interacting with sessions generated by RMDs on the Mobile component 8. The Reporting Tools component provides tools for managing some of the metadata associated with sessions, re-sending sessions emails to advisors and linking to the session views in the Web component 14.

In addition, the Session Management tools component 12 provides a system administration interface intended for use for use by system administrators. The administration interface is a web-based user interface for managing the data import process for the system. The administration interface integrates with the Reporting Tools component and administrators can use the interface for looking up session information for troubleshooting purposes.

The Spring Framework 10 addresses the enterprise concern of taking the classes, model objects 32, and services that are to compose an application, by providing a formalized means of composing these various disparate components into a fully working application ready for use. The Spring Framework 10 takes best practices that have been proven over the years in numerous applications and formalized as design patterns, and actually codifies these patterns as first class objects that one can take away and integrate into various application(s). The Spring Framework 10 includes a Spring ORM module 20, a JDBC module 22, and a Spring Security module 18. The Spring ORM module 20 is a package that provides integration layers for model objects 32 using popular object-relational mapping application programming interfaces (APIs), including JPA, JDO, Hibernate, and iBatis. Using the Spring ORM module 20, one can use all those OIR-mappers in combination with all the other features Spring Framework 10 offers in relations to various model objects 32. The JDBC module 22 provides a JDBC-abstraction layer that removes the need to do tedious JDBC coding and parsing of database-vendor specific error codes. In this case, the JDBC module 22 provides a JDBC-abstraction layer to the Morning Star database 28 and RMD territory database 30. Also, the JDBC module 22 is a JDBC package providing a way to do programmatic as well as declarative transaction management, not only for classes implementing special interfaces, but for all POJOs (plain old Java objects).

The Spring Security module 18 provides comprehensive security services for J2EE-based enterprise software applications used by the funds comparison tool 2. There are two major areas of application security are "authentication" and "authorization" (or "access-control"). These are the two main areas that Spring Security module 18 targets. "Authentication" is the process of establishing a principal is who they claim to be (a "principal" generally means a user, device or some other system which can perform an action in your application). "Authorization" refers to the process of deciding whether a principal is allowed to perform an action within your application. To arrive at the point where an authorization decision is needed, the identity of the principal has already been established by the authentication process using the Sun Access Manager. 24 These concepts are common, and not at all specific to Spring Security.

Figure 2:
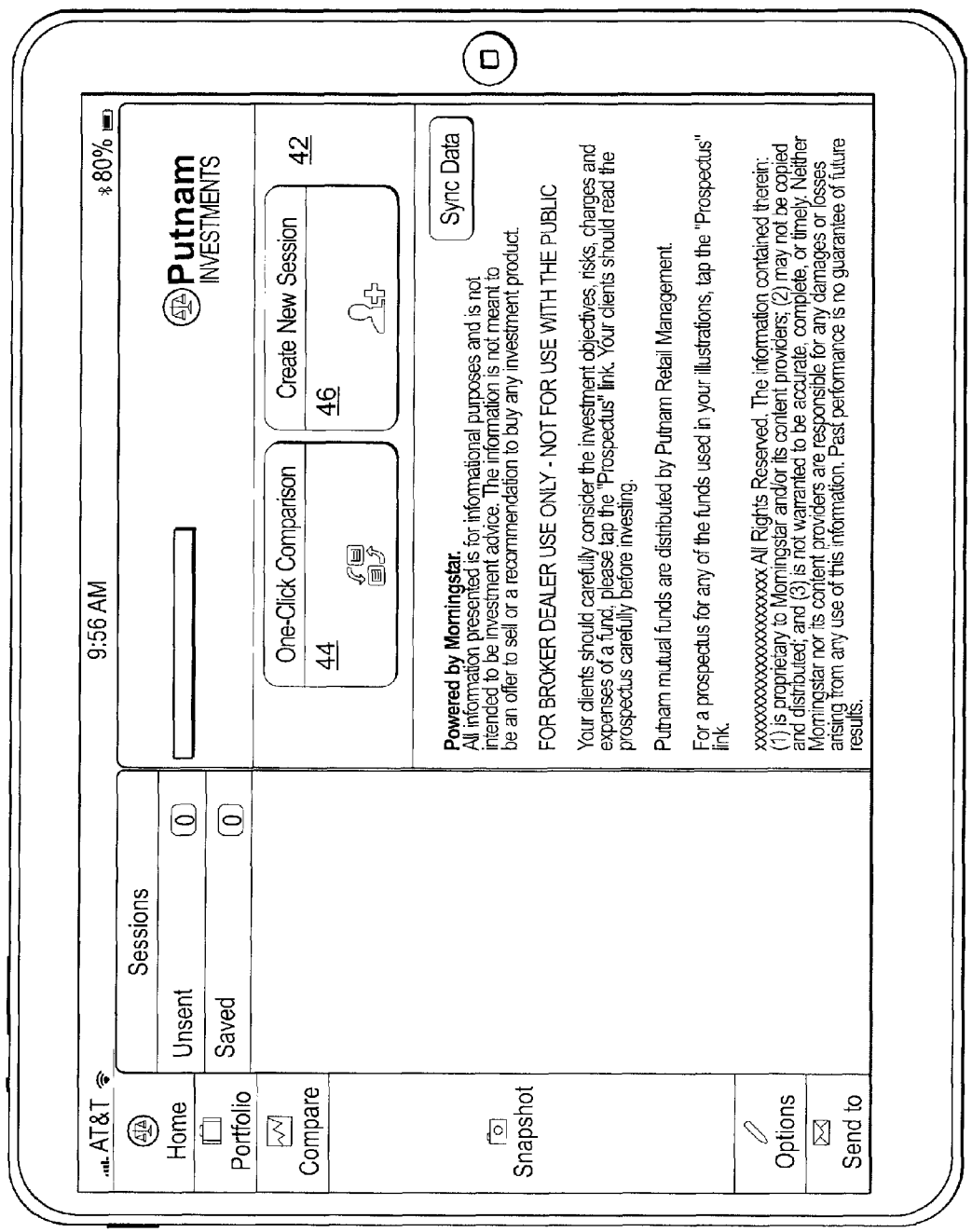
FIG. 2 is a schematic diagram illustrating using the funds comparison tool to start a session.

FIG. 2 is a schematic diagram illustrating using the funds comparison tool 2 to start a session. In this case, the mobile app is being used with an IPad 40, however, in other embodiments of the invention other mobile devices can be used. Also, the illustration of the user interface 42 will not vary in scope as compared to the web-based tool. Once a user executes the mobile app, the user interface 42 is presented with two options including descriptions to create a new session tab 44 that associates the user with an advisor or instantly start fund-to-fund comparison tab 46 without associating the user with an advisor. The user can tap either tab options 44, 46 to proceed. Once a new session is created the user can save that session for later use.

Figure 3:
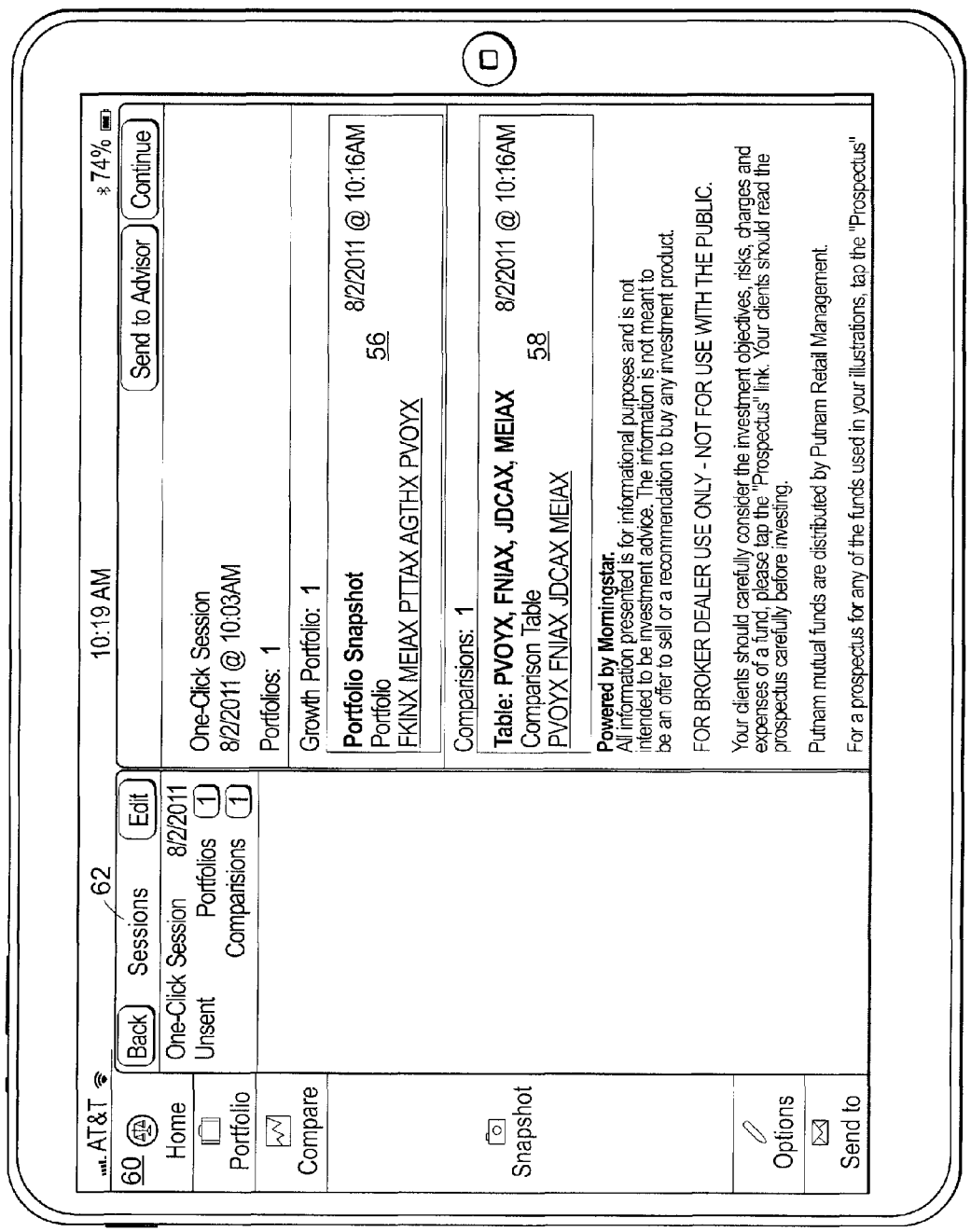
FIG. 3 is a schematic illustrating opening a previous session using the funds comparison tool.

FIG. 3 is schematic illustrating opening a previous session 54 using the funds comparison tool 2. From the home screen 60, a user can tap the "Sessions" bar 62 to view a previous session and its snapshots. In this case, this session includes a portfolio snapshot 56 and fund comparison 58. The user can tap either of these two sessions 56, 58 and continue working and save these sessions 56, 58 for later use. With regards to the portfolio snapshot 56, a user can select a portfolio of funds and perform various analytics which are later displayed in various charts or graphs using a snapshot of data of a defined time period. Moreover, the funds comparison session 58 allows the user to select a number of funds, which in this case is 4 but can be more in other embodiments of the invention, and various comparisons analytics are provided to aid in determining the best funds for a user.

Figure 4:
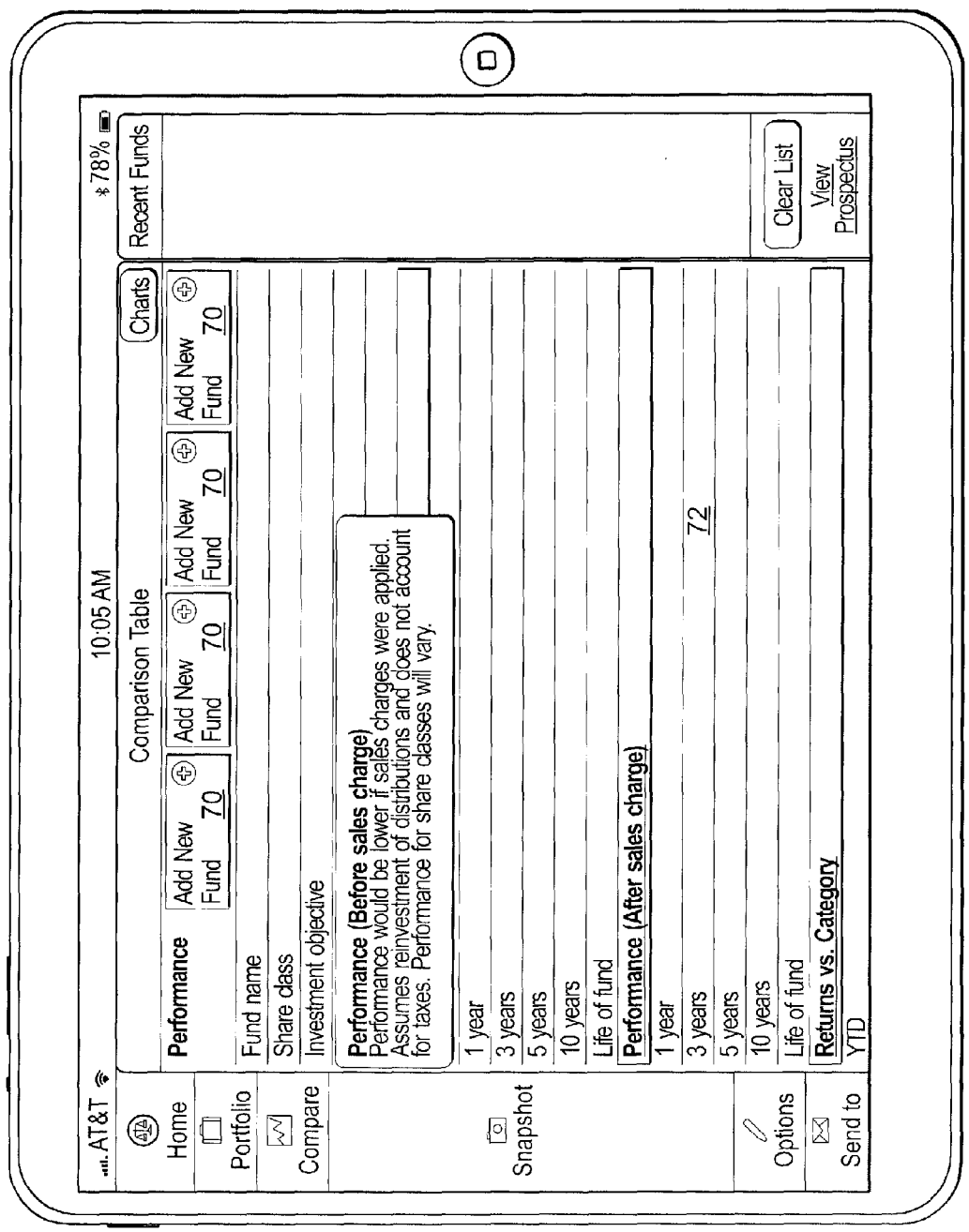
FIG. 4 is a schematic diagram illustrating a comparison screen used in funds comparison.
Figure 5:
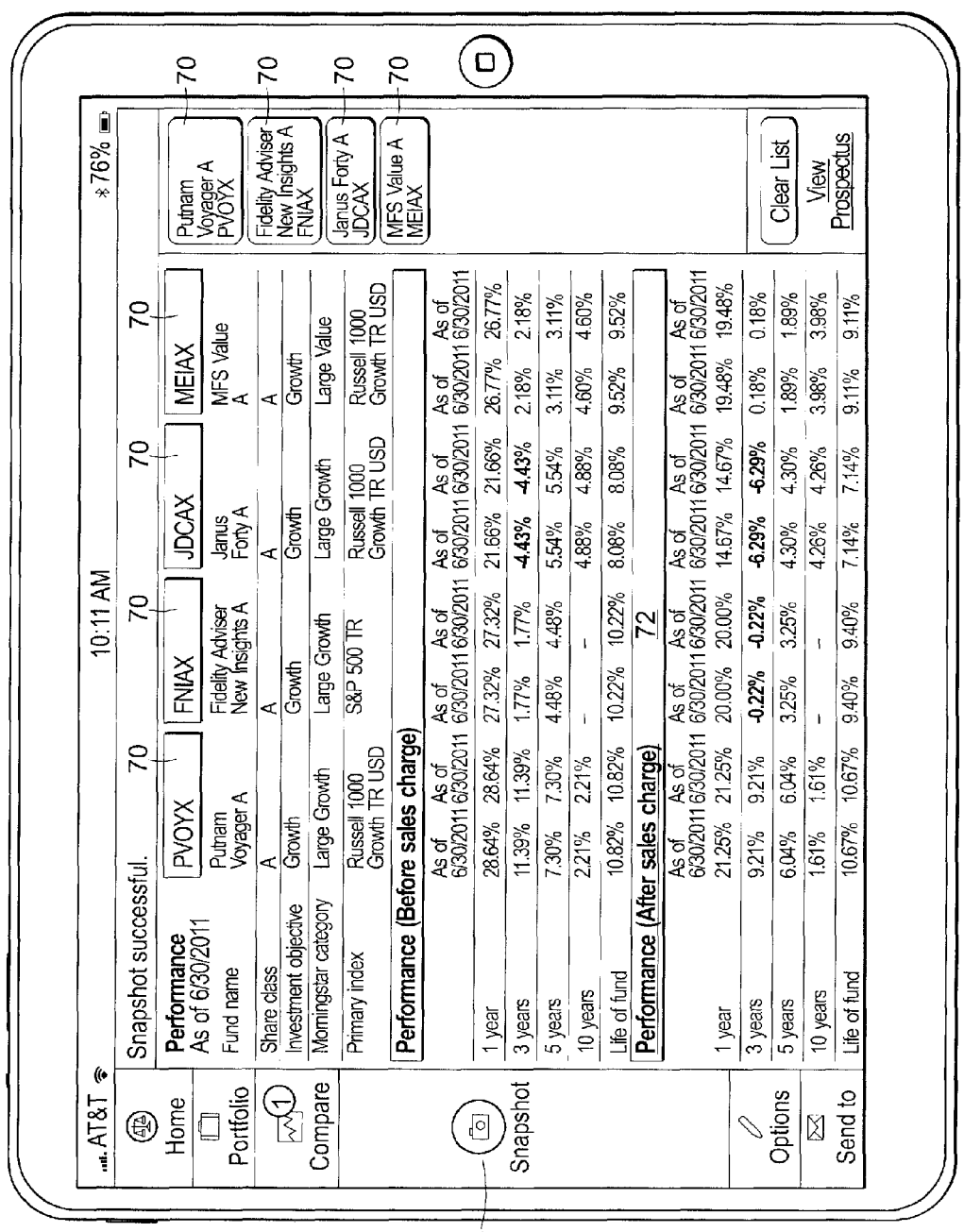
FIG. 5 is a schematic diagram illustrating the comparison screen of FIG. 4 including comparison data.

FIG. 4 is a schematic diagram illustrating the comparison screen 68 used in funds comparison. The comparison screen 68 includes a number of "Add fund" tabs 70 and a performance table 72 that defines the performance before and after sale charges. The user can tap on the "Add fund" tabs 70 to add their respective funds they prefer to run for comparison. Once all the funds are provided, the information in the performance table 72 are included as shown in FIG. 5. Also, a user can tap the camera icon 74 to produce a snapshot of the current contents in the comparison screen 68.

Figure 6:
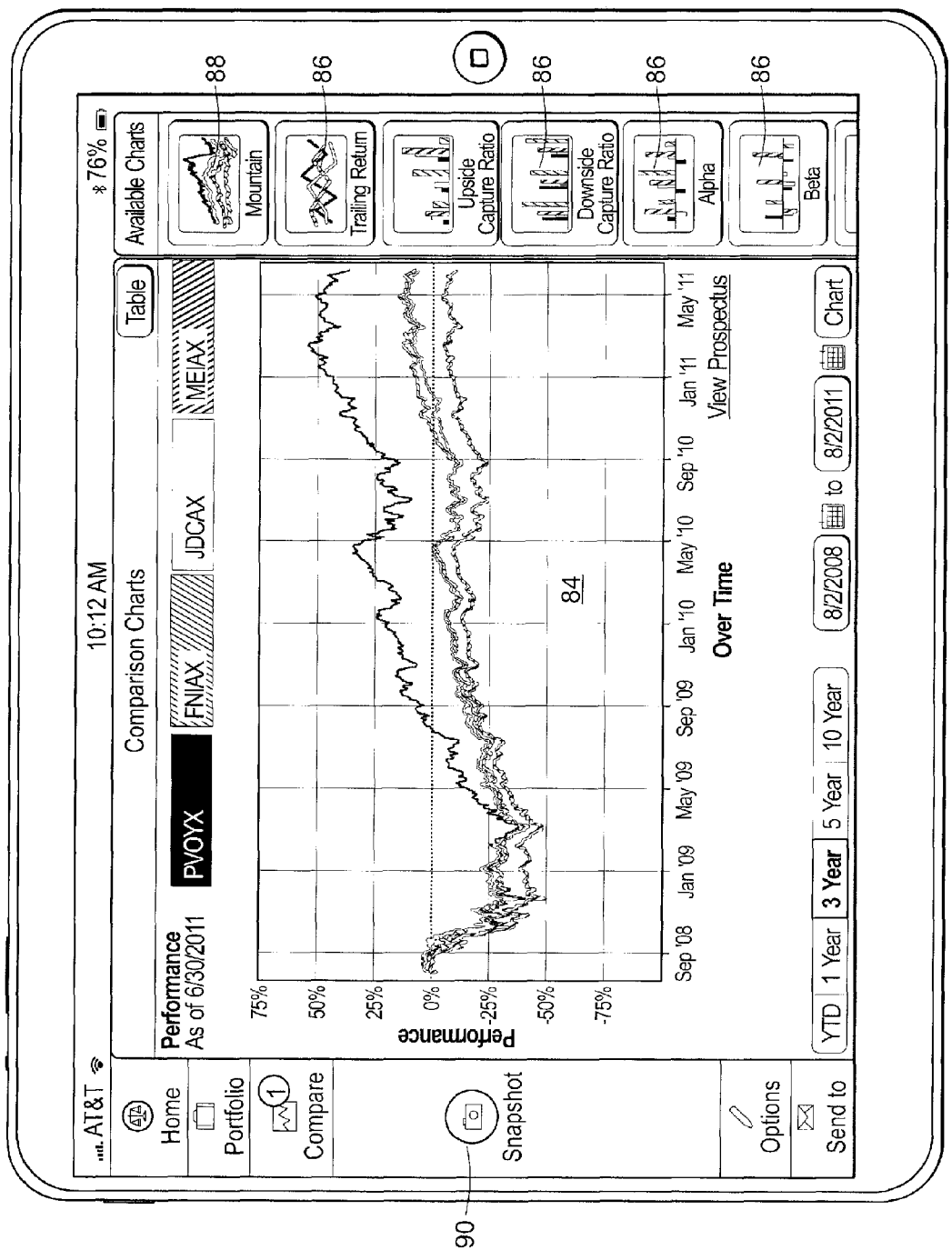
FIG. 6 is a schematic diagram illustrating a funds comparison chart used in accordance with the invention.

FIG. 6 is a schematic diagram illustrating a funds comparison chart 84 used in accordance with the invention. As shown, the funds comparison chart 84 displays comparison data of the various funds used in the comparison. Also, an "Available Charts" tab 88 is provided demonstrating the various analytic comparison charts 86 that are provided by the funds comparison tool 2. The user can select a chart by selectively tapping one of the charts 86 in the "Available Charts" tab 88. Moreover, the user can create a snapshot of the comparison chart 84 by selectively tapping the camera icon 90.

Figure 7:
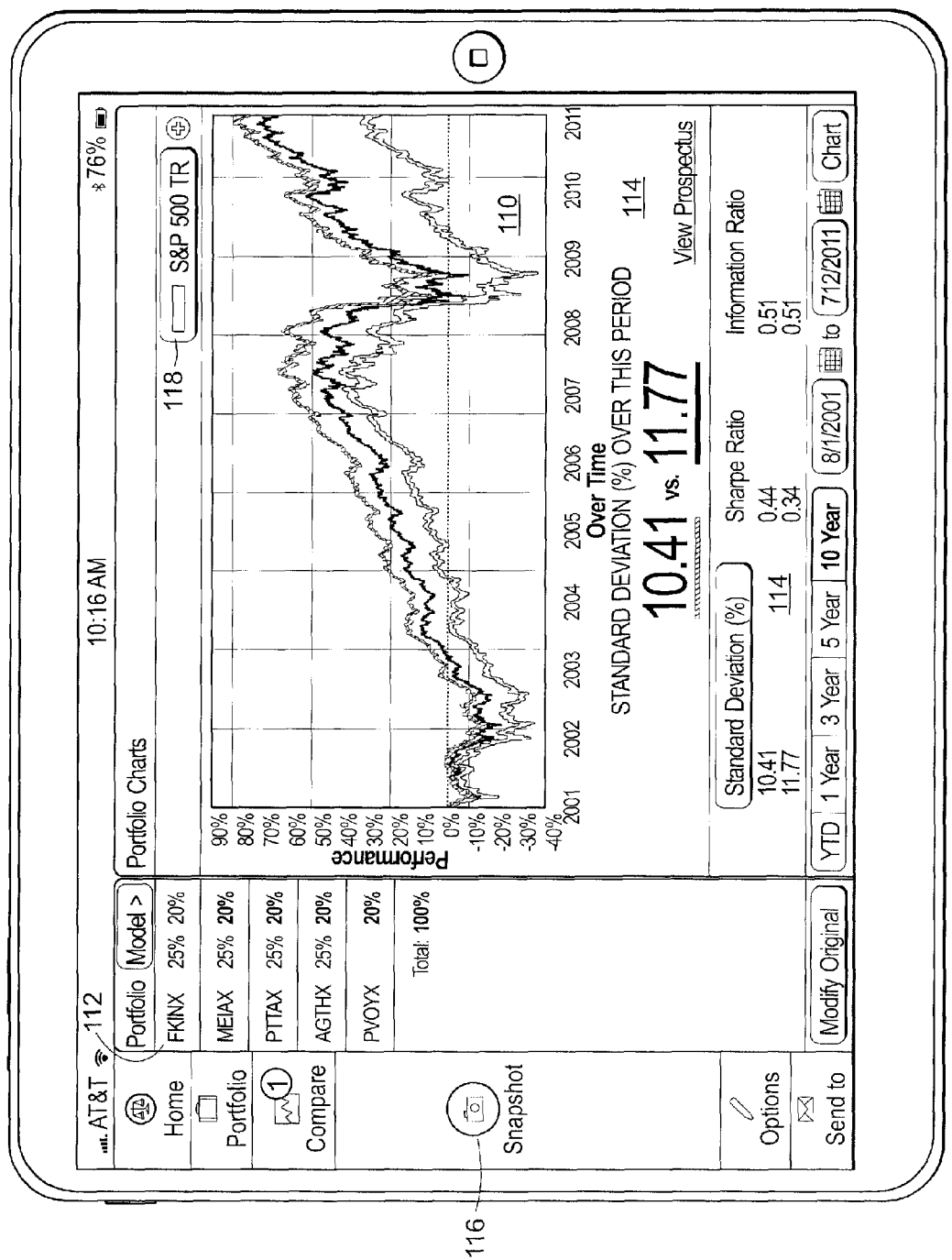
FIG. 7 is a schematic diagram illustrating a portfolio comparison chart used in accordance with invention.

FIG. 7 is a schematic diagram illustrating a portfolio comparison chart 68 used in accordance with invention. The portfolio chart 68 includes a portfolio tab 112 defining the number of portfolio used in the comparison. A user must provide a name of the portfolio, the benchmark 118, and the funds defining a respective portfolio, and a weight value defining the percentage of the portfolio associated with the fund. In this case, the user can define up to 4 portfolio funds but in other embodiments of the invention more portfolio funds can be defined. Based on the provided portfolio information, the funds comparison tool 2 retrieves information regarding the funds in the portfolio from the various database described herein. Using this information, the portfolio comparison chart 110 is formed including the analytic information 114 comparing the performance of the portfolios provided. Moreover, the current snapshots of the portfolio chart 110 and its respective analytics 114 can be taken by the user by selectively tapping the camera icon 116.

Although the present invention has been shown and described with respect to several preferred embodiments thereof, various changes, omissions and additions to the form and detail thereof, may be made therein, without departing from the spirit and scope of the invention.

What is claimed is:

1. A funds comparison tool embodied in a non-transitory computer readable medium comprising:
a presentation tier executing on a first processor that provides a plurality of interfaces for interacting with a plurality of client applications, the presentation tier allows the client applications to send requests for a plurality of analytics to be performed regarding comparing the performance of one or more funds or portfolios as well as allowing mobile-based client applications and web-based client applications to communicate with the funds comparison tool; and
an application tier executing on a second processor that includes a web services component that processes the requests sent by the client applications by providing the data used by the client applications, storing and retrieving of session data, said web services component includes an interface for the analytics information captured during sessions so as to allow a visualization of the analytics used in the comparison of the one or more funds or portfolios, said client applications interact with said application tier through said web services component, the visualization of the analytics includes providing the user a plurality of reporting tools to assess the comparison of the portfolios selected by the user, the application tier includes an analytics package that allows comparisons between the one or more funds or portfolios selected by the user by capturing a snapshot of data for analysis and providing its results to the reporting tools, the snapshot of data includes fund-specific performance data associated with the performance and risk of funds, the application tier uses the snapshot of data and fund-specific performance data to compute relevant fund specific comparison information or portfolio specific comparison information using the analytics package and provides the fund specific comparison information or portfolio specific comparison information to the reporting tools to display the information in a platform independent format selected by the user, the user is presented a user interface including descriptions to create a new session that associates the user with an advisor or instantly start fund-to-fund comparison without associating the user with the advisor.

2. The funds comparison tool of claim 1 further comprising a session management tool that includes a reporting tools component that is a web-based interface for interacting with the sessions generated.

3. The funds comparison tool of claim 2, wherein the reporting tools component provides tools for managing metadata associated with the sessions, re-sending sessions emails to advisors, and linking to session views in the presentation tier.

4. The funds comparison tool of claim 1, wherein the presentation tier comprises a mobile-based interface component and web-based component to communicate with client applications.

5. The funds comparison tool of claim 4, wherein the mobile-based client applications communicate with the presentation tier using a mobile-based interface component.

6. The funds comparison tool of claim 4, wherein the web-based client applications communicate with the presentation tier using a web-based interface component.

7. The funds comparison tool of claim 1, wherein the session management tool comprises an administration interface that allows one or more system administrators to manage the data import process for the funds comparison tool.

8. The funds comparison tool of claim 1, wherein the application tier comprises a framework that manages authorization and access to the funds comparison tool.

9. The funds comparison tool of claim 8, wherein the framework manages access to external databases to be used by the funds comparison tool.

10. The funds comparison tool of claim 1, wherein the application tier allows a snapshot of the analytics information captured during sessions to be stored or sent to another party.

11. A computer-implemented method of performing comparison analysis of one or more funds or portfolios in a network environment using a funds comparison tool within a computer system comprising:
providing a plurality of interfaces for interacting with a plurality of client applications using a presentation tier,
allowing the client applications to send request for a plurality of analytics to be performed regarding comparing the performance of the one or more funds or portfolios as well as allowing mobile-based client applications and web-based client applications to communicate with the funds comparison tool; and
processing the requests sent by the client applications using a web services component of an application tier by providing the data used by the client applications, storing and retrieving session data, said web services component includes an interface for the analytics information captured during sessions so as to allow a visualization of the analytics used in the comparison of the one or more funds or portfolios, said client applications interact with said application tier through said web services component, the visualization of the analytics includes providing the user a plurality of tools to assess the comparison of the one or more funds or portfolios selected by the user, the application tier includes an analytics package that allows comparisons between the one or more funds or portfolios selected by the user by capturing a snapshot of data for analysis and providing its results to the reporting tools, the snapshot of data includes fund-specific performance data associated with the performance and risk of funds, the application tier uses the snapshot of data and fund-specific performance data to compute relevant fund specific comparison information or portfolio specific comparison information using the analytics package and provides the fund specific comparison information or portfolio specific comparison information to the reporting tools to display the information in a platform independent format selected by the user, the user is presented a user interface including descriptions to create a new session that associates the user with an advisor or instantly start fund-to-fund comparison tab without associating the user with the advisor.

12. The method of claim 11 further comprising providing a session management tool that includes a reporting tools component that is a web-based interface for interacting with the sessions generated.

13. The method of claim 12, wherein the reporting tools component provides tools for managing metadata associated with the sessions, re- sending sessions emails to advisors, and linking to session views in the presentation tier.

14. The method of claim 11, wherein the presentation tier comprises a mobile-based interface component and web-based component to communicate with client applications.

15. The method of claim 14, wherein the mobile-based client applications communicate with the presentation tier using a mobile-based interface component.

16. The method of claim 14, wherein the web-based client applications communicate with the presentation tier using a web-based interface component.

17. The method of claim 11, wherein the session management tool comprises an administration interface that allow one or more system administrators to manage the data import process for the funds comparison tool.

18. The method of claim 11, wherein the application tier comprises a framework that manages authorization and access to the funds comparison tool.

19. The method of claim 18, wherein the framework manages access to external databases to be used by the funds comparison tool.

20. The method of claim 11, wherein the application tier allows a snapshot of the analytics information captured during sessions to be stored or sent to another party.

* * * * *